(12) United States Patent
Baek et al.

(10) Patent No.: US 11,650,443 B2
(45) Date of Patent: May 16, 2023

(54) DISPLAY DEVICE

(71) Applicant: LG ELECTRONICS INC., Seoul (KR)

(72) Inventors: Sangmin Baek, Seoul (KR); Inhwi Lee, Seoul (KR); Jaehun Kim, Seoul (KR); Keumdoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/214,024

(22) Filed: Mar. 26, 2021

(65) Prior Publication Data

US 2021/0333612 A1    Oct. 28, 2021

(30) Foreign Application Priority Data

Apr. 23, 2020 (KR) .................... 10-2020-0049331

(51) Int. Cl.
  *G02F 1/1333* (2006.01)
  *G02F 1/1335* (2006.01)

(52) U.S. Cl.
  CPC .. *G02F 1/133314* (2021.01); *G02F 1/133526* (2013.01); *G02F 1/133553* (2013.01)

(58) Field of Classification Search
  CPC ......... G02F 1/133608; G02F 1/133314; G02F 1/133526; G02F 1/133553; G02F 1/133612; G02F 1/133607; H01L 27/32
  See application file for complete search history.

(56) References Cited

U.S. PATENT DOCUMENTS

| | | | | |
|---|---|---|---|---|
| 2011/0141403 | A1* | 6/2011 | Kishimoto | ........ G02F 1/133608 362/382 |
| 2012/0092562 | A1* | 4/2012 | Omiya | ..................... H04N 5/64 362/249.07 |
| 2013/0208449 | A1* | 8/2013 | Matsukawa | ....... G02F 1/133608 362/372 |

(Continued)

FOREIGN PATENT DOCUMENTS

| | | | | |
|---|---|---|---|---|
| JP | WO 2013125125 | * | 8/2013 | ....... G02F 1/133603 |
| JP | WO 2013175875 | * | 11/2013 | ....... G02F 1/133606 |

(Continued)

OTHER PUBLICATIONS

PCT International Application No. PCT/KR2021/003151, International Search Report dated Jul. 8, 2021, 5 pages.

*Primary Examiner* — Zheng Song
(74) *Attorney, Agent, or Firm* — Lee, Hong, Degerman, Kang & Waimey PC

(57) ABSTRACT

A display device is provided. The display device according to the present disclosure includes: a display panel; a frame positioned behind the display panel; a substrate having an elongated shape and coupled to the frame; an optical assembly mounted on the substrate and configured to provide light to the display panel; and a plurality of holders coupling the substrate to the frame, wherein the plurality of holders includes: a first holder disposed adjacent to a first elongated side of the substrate; and a second holder disposed adjacent to a second elongated side of the substrate opposite the first elongated side and positioned opposite to the first holder, wherein the first holder and the second holder are configured to secure the substrate.

14 Claims, 27 Drawing Sheets

(56) References Cited

U.S. PATENT DOCUMENTS

| | | | |
|---|---|---|---|
| 2013/0278860 A1* | 10/2013 | Choi | G02F 1/133608 349/58 |
| 2014/0347864 A1* | 11/2014 | Kawada | G02F 1/133603 362/294 |
| 2016/0124268 A1* | 5/2016 | Ohtsuka | F21V 29/70 362/97.3 |
| 2016/0223866 A1* | 8/2016 | Lee | G02F 1/133608 |
| 2017/0023213 A1* | 1/2017 | Kim | H01L 33/58 |
| 2017/0034941 A1* | 2/2017 | McCurley | H05K 1/0203 |
| 2017/0045199 A1* | 2/2017 | Kim | G02F 1/133608 |
| 2017/0328544 A1* | 11/2017 | Gergely | F21S 4/28 |
| 2020/0174318 A1* | 6/2020 | Cho | H01L 33/58 |

FOREIGN PATENT DOCUMENTS

| | | |
|---|---|---|
| KR | 10-2016-0051566 | 5/2016 |
| KR | 10-2017-0083248 | 7/2017 |
| KR | 10-2018-0004463 | 1/2018 |
| KR | 10-2018-0004464 | 1/2018 |
| KR | 10-2018-0004467 | 1/2018 |
| KR | 10-2020-0051535 | 5/2020 |

\* cited by examiner

DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2020-0049331, filed on Apr. 23, 2020, the contents of which are hereby incorporated by reference herein in its entirety.

BACKGROUND OF THE INVENTION

1. Field of the Invention

The present disclosure relates to a display device.

2. Description of the Related Art

With the development of information society, there are increasing demands for various types of display devices. In order to meet such demands, various display devices have been developed and used, including a Liquid Crystal Display (LCD), a Plasma Display Panel (PDP), an Electro luminescent Display (ELD), a Vacuum Fluorescent Display (VFD), an Organic Light Emitting Diode (OLED), and the like.

Among these devices, the liquid crystal display panel of the LCD device includes a liquid crystal layer, and a thin film transistor (TFT) substrate and a color filter substrate being disposed opposite to each other with the liquid crystal layer interposed therebetween. The liquid crystal display panel displays an image by using light provided by a backlight unit of the liquid crystal display.

Recently, many studies are conducted on the backlight unit to provide improved reliability of the display device.

SUMMARY OF THE INVENTION

It is an object of the present disclosure to solve the above and other problems.

It is another object of the present disclosure to provide a heat dissipating structure of a backlight unit.

It is yet another object of the present disclosure to provide a coupling structure of a backlight unit and a frame.

It is still another object of the present disclosure to provide a backlight unit with improved durability or quality.

It is still another object of the present disclosure to provide a display device with improved convenience in assembly.

In accordance with an aspect of the present disclosure, the above and other objects can be accomplished by providing a display device, including: a display panel; a frame positioned behind the display panel; a substrate having an elongated shape and coupled to the frame; an optical assembly mounted on the substrate and configured to provide light to the display panel; and a plurality of holders coupling the substrate to the frame, wherein the plurality of holders includes: a first holder disposed adjacent to a first elongated side of the substrate; and a second holder disposed adjacent to a second elongated side of the substrate opposite the first elongated side and positioned opposite to the first holder, wherein the first holder and the second holder are configured to secure the substrate.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
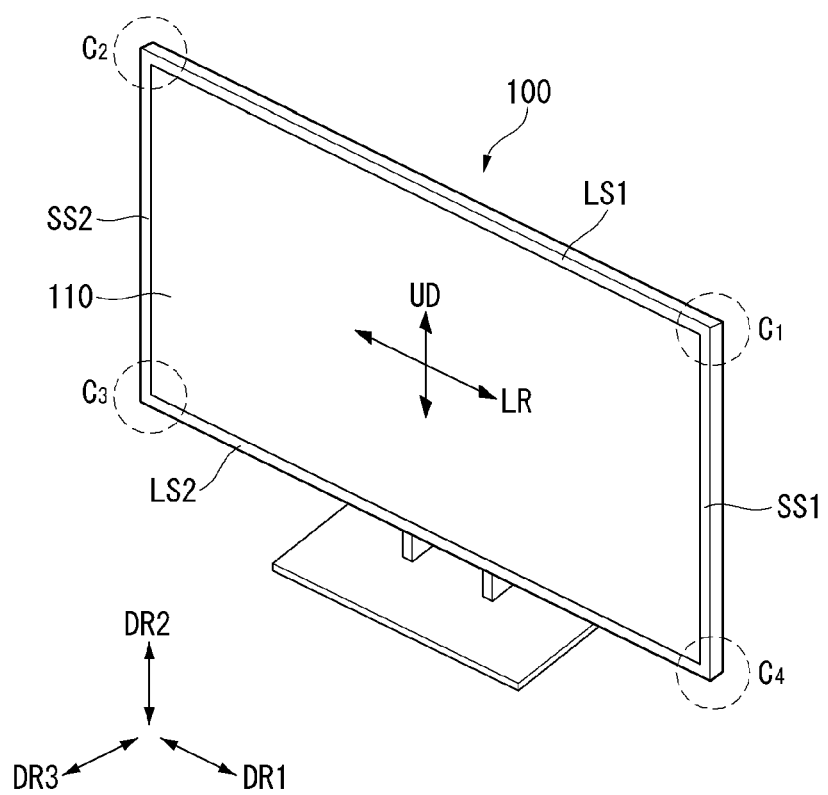
FIGS. 1 to 27 are views illustrating display devices according to embodiments of the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components, and a redundant description thereof will be omitted.

Terms "module" and "part" for elements used in the following description are given simply in view of the ease of the description, and do not carry any important meaning or role. Therefore, the "module" and the "part" may be used interchangeably.

Descriptions of some well-known technologies that possibly obscure the disclosure will be omitted, if necessary. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

In the following description, a display panel will be described using a Liquid Crystal Display (LCD) device as an example, but the display panel which may be applied to the present disclosure is not limited to the LCD panel.

Referring to FIG. 1, a display device 100 may include a first long side LS1; a second long side LS2 opposite to the first long side LS1; a first short side SS1 adjacent to the first long side LS1 and the second long side LS2; and a second short side SS2 opposite to the first short side SS1.

Here, an area of the first short side SS1 may be referred to as a first side area; an area of the second short side SS2 may be referred to as a second side area opposite to the first side area; an area of the first long side LS1 may be referred to as a third side area adjacent to the first side area and the second side area, and disposed between the first side area and the second side area; and an area of the second long side LS2 may be referred to as a fourth side area adjacent to the first side area and the second side area, disposed between the first side area and the second side area, and opposite to the third side area.

For convenience of explanation, it is illustrated and described that the first and second long sides LS1 and LS2 are longer than the first and second short sides SS1 and SS2, but there may also be a case in which the lengths of the first and second long sides LS1 and LS2 may be approximately equal to the lengths of the first and second short sides SS1 and SS2.

In the following description, a first direction DR1 may be a direction parallel to the first and second long sides LS1 and LS2 of the display device 100, and a second direction DR2 may be a direction parallel to the first and second short sides SS1 and SS2 of the display device 100. A third direction DR3 may be a direction perpendicular to the first direction DR1 and/or the second direction DR2.

The first direction DR1 and the second direction DR2 may be collectively referred to as a horizontal direction. Further, the third direction DR3 may be referred to as a vertical direction.

A side or a surface, on which the display device 100 displays an image, may be referred to as a front side or a front surface. When the display device 100 displays the image, a side or a surface, at which the image may not be viewed, may be referred to as a back side or a back surface. When the display device 100 is viewed from the front side or the front surface, the first long side LS1 may be referred to as an upper side or an upper surface. Likewise, the second long side LS2 may be referred to as a lower side or a lower surface; the first short side SS1 may be referred to as a right side or a right surface; and the second short side SS2 may be referred to as a left side or a left surface.

The first long side LS1, the second long side LS2, the first short side SS1, and the second short side SS2 may be referred to as edges of the display device 100. Further, positions where the first long side LS1, the second long side LS2, the first short side SS1, and the second short side SS2 meet each other may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

Here, a direction from the first short side SS1 to the second short side SS2 or a direction from the second short side SS2 to the first short side SS1 may be referred to as a left and right direction LR. A direction from the first long side LS1 to the second long side LS2 or a direction from the second long side LS2 to the first long side LS1 may be referred to as an up and down direction UD.

Figure 2:
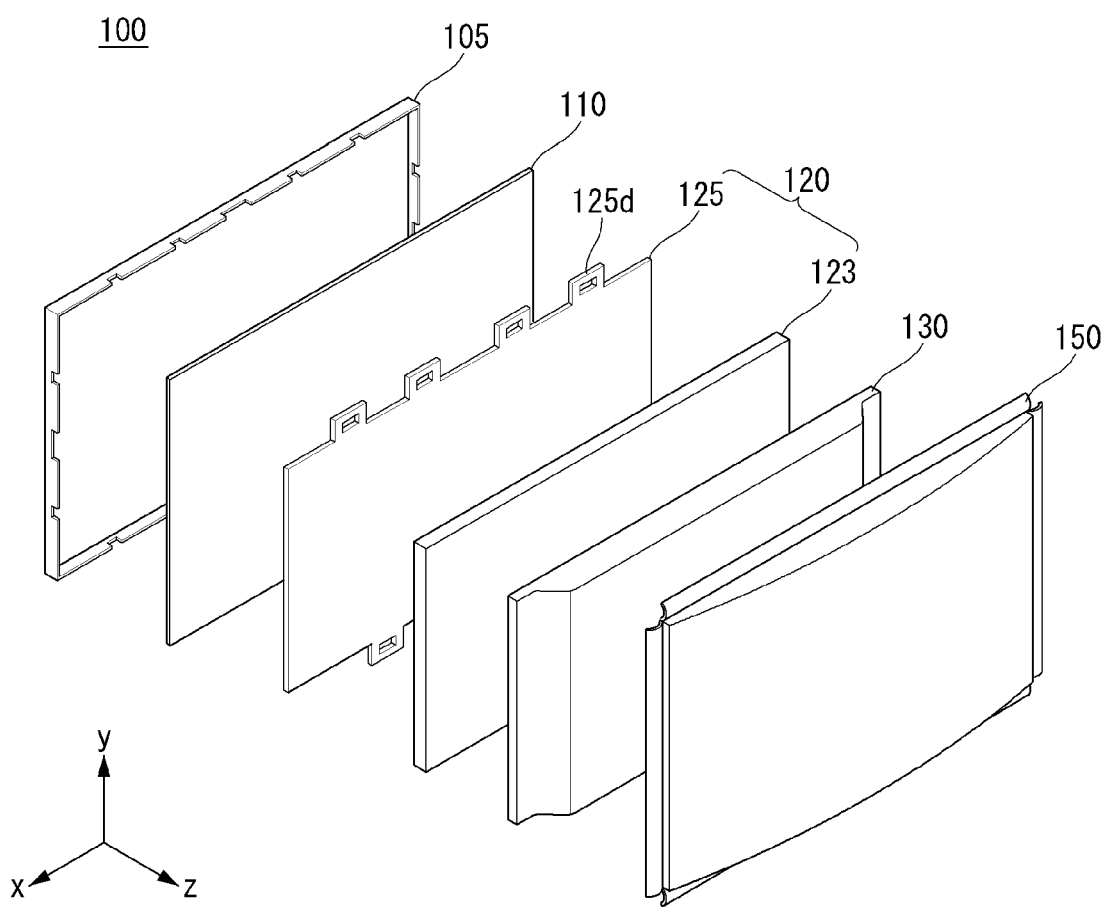

Referring to FIG. 2, a front cover 105 may cover at least a portion of the front surface or a side surface of a display panel 110. The front cover 105 may be formed in the shape of a square frame with a hollow center.

The front cover 105 may be divided into a front surface cover and a side surface cover, i.e., a front surface cover disposed on a front surface of the display panel 110, and a side surface cover disposed on a side surface of the display panel 110. The front surface cover and the side surface cover may be provided separately. Either the front surface cover or the side surface cover may be omitted. For example, there may be a case in which only the side surface cover is provided without the front surface cover.

The display panel 110 may be provided on the front surface of the display device 100 and may display images. The display panel 110 may include a plurality of pixels and may output an image in accordance with color, brightness, and chroma of each pixel. The display panel 110 may be divided into an active area, in which an image is displayed, and an inactive area in which no image is displayed. The display panel 110 may include a front substrate and a rear substrate which are disposed opposite to each other with a liquid crystal layer disposed therebetween.

The front substrate may include a plurality of pixels, each including red (R), green (G), and blue (B) subpixels, and may generate a red, green, or blue image according to a control signal.

The rear substrate may include switching elements. The rear substrate may switch pixel electrodes. For example, the pixel electrode may change a molecular arrangement of a liquid crystal layer according to a control signal applied from the outside. The liquid crystal layer may include a plurality of liquid crystal molecules. The arrangement of the liquid crystal molecules may be changed in response to a difference in voltage applied between the pixel electrode and the common electrode. The liquid crystal layer may transfer light, provided from a backlight unit 120, to the front substrate.

A backlight unit 120 may be disposed on a rear surface the display panel 110. The backlight unit 120 may include a plurality of light sources. The backlight unit 120 may be of a direct type or an edge type. The edge-type backlight unit 120 may further include a light guide unit or a light guide panel.

The backlight unit 120 may be coupled to a front surface of the frame 130. For example, the plurality of light sources may be disposed on the front surface of the frame 130, in which case, the backlight unit 120 may be collectively referred to as a direct-type backlight unit.

The backlight unit 120 may be driven by a full driving scheme or a partial driving scheme such as local dimming, impulsive, and the like. The backlight unit 120 may include an optical sheet 125 and an optical layer 123.

The optical sheet 125 may cause light from the light sources to be transmitted evenly to the display panel 110. The optical sheet 125 may be composed of a plurality of layers. For example, the optical sheet 125 may include at least one prism sheet and/or at least one diffusion sheet.

The optical sheet 125 may include at least one coupling portion 125*d*. The coupling portion 125*d* may be coupled to the front cover 105 and/or the back cover 150. That is, the coupling portion 125*d* may be coupled directly to the front cover 105 and/or the back cover 150. Alternatively, the coupling portion 125*d* may be coupled to a structure connected to the front cover 105 and/or the back cover 150. That is, the coupling portion 125*d* may be coupled indirectly to the front cover 105 and/or the back cover 150.

The optical layer 123 may include light sources and the like.

The frame 130 may support components of the display device 100. For example, the backlight unit 120 and the like may be coupled to the frame 130. The frame 130 may be made of a metal material, such as an aluminum alloy and the like.

The back cover 150 may be disposed on a rear surface of the display device 100. The back cover 150 may protect internal components from external environments. At least a portion of the back cover 150 may be coupled to the frame 130 and/or the front cover 105.

The back cover 150 may be molded with a resin material.

Figure 3:
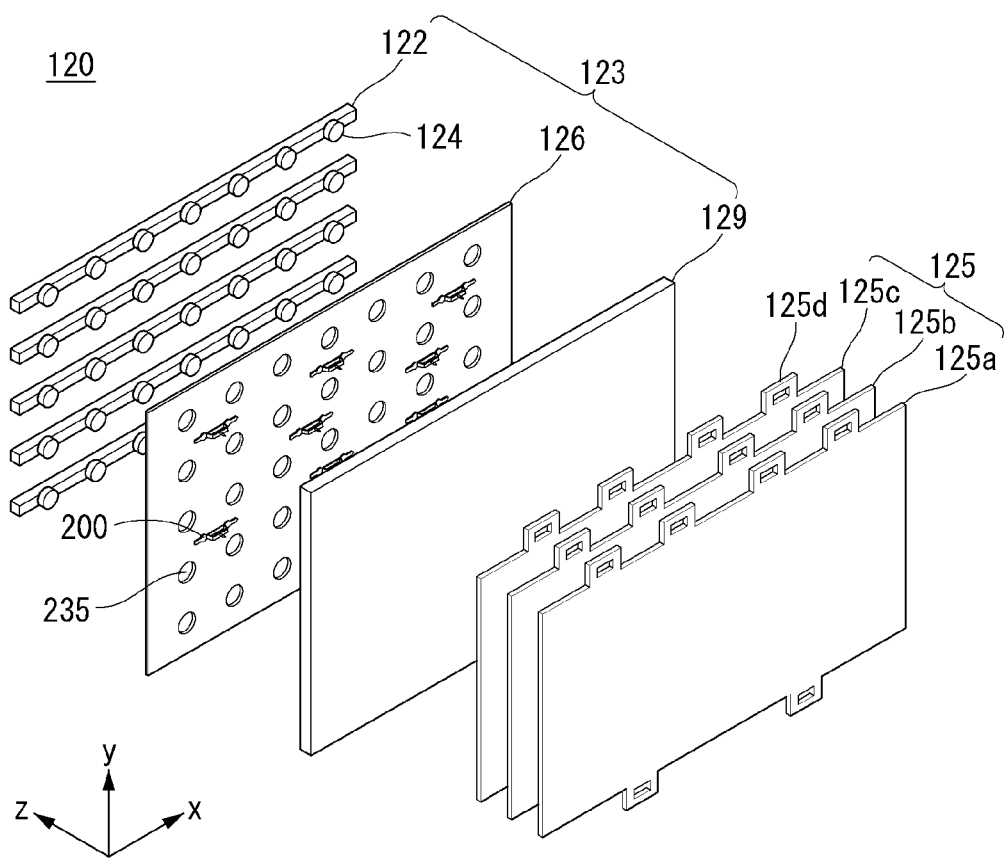

Referring to FIG. 3, the backlight unit 120 may include: the optical layer 123 having a substrate 122, at least one optical assembly 124, a reflective sheet 126, and a diffusion plate 129; and the optical sheet 125 disposed in front of the optical layer 123.

The substrate 122 may be formed with a plurality of straps extending in a first direction and being spaced apart from each other in the second direction perpendicular to the first direction.

At least one optical assembly 124 may be mounted on the substrate 122. An electrode pattern for connecting an adaptor and the optical assembly 124 may be formed on the substrate 122. For example, a carbon nano tube (CNT) electrode pattern may be formed on the substrate 122 for connecting the optical assembly 124 and the adaptor.

The substrate 122 may be made of at least one of polyethylene terephthalate (PET), glass, polycarbonate (PC), and silicon. The substrate 122 may be a printed circuit board (PCB), on which at least one optical assembly 124 is mounted.

The optical assemblies 124 may be disposed on the substrate 122 at predetermined intervals in a first direction. A diameter of the optical assemblies 124 may be greater than a width of the substrate 122. That is, the diameter of the optical assemblies 124 may be greater than the length of the substrate 122 in the second direction.

The optical assembly 124 may be a light emitting diode (LED) chip or an LED package including at least one LED chip.

The optical assembly 124 may be configured as a white LED or a colored LED emitting light of at least one of red, blue, and green. The colored LED may include at least one of a red LED, a blue LED, and a green LED.

A light source included in the optical assembly 124 may be of a chip-on-board (COB) type. The COB type may be a type formed by directly coupling an LED chip, which is a light source, to the substrate 122, such that a manufacturing process may be simplified. Also, resistance may be reduced, thereby reducing energy lost to heat. That is, power efficiency of the optical assembly 124 may be enhanced. The COB type may provide brighter lighting. The COB type may be made thinner and lighter than the related art.

The reflective sheet 126 may be disposed on a front surface of the substrate 122. The reflective sheet 126 may be disposed on an area other than the area of the substrate 122 where the optical assemblies 124 are formed. That is, a plurality of through holes 235 may be formed in the reflective sheet 126.

The reflective sheet 126 may reflect light forward, which is provided from the optical assemblies 124. Further, the reflective sheet 126 may reflect light, reflected from the diffusion plate 129, toward the diffusion plate 129 again.

The reflective sheet 126 may contain at least one of a metal and a metal oxide as reflective materials. For example, the reflective sheet 126 may include a metal and/or a metal oxide having high reflectivity, such as at least one of aluminum (Al), silver (Ag), gold (Au), and titanium dioxide ($TiO_2$).

The reflective sheet 126 may be formed by depositing and/or coating a metal or a metal oxide on the substrate 122. Ink containing a metal may be printed on the reflective sheet 126. The reflective sheet 126 may include a deposition layer formed using a vacuum deposition method such as thermal deposition, evaporation, or sputtering. The reflective sheet 126 may have a coated layer and/or a printed layer formed by printing, gravure coating, or silk-screening.

An air gap may be positioned between the reflective sheet 126 and the diffusion plate 129. The air gap may function as a buffer to cause light emitted from the optical assemblies 124 to be widely diffused. In order to maintain the air gap, a supporter 200 may be disposed between the reflective sheet 126 and the diffusion plate 129.

A resin may be deposited on the optical assemblies 124 and/or the reflective sheet 126. The resin may serve to diffuse light emitted from the optical assemblies 124. The diffusion plate 129 may diffuse light upward after the light is emitted from the optical assemblies 124.

The optical sheet 125 may be disposed in front of the diffusion plate 129. A rear surface of the optical sheet 125 may be pressed against the diffusion plate 129, and a front surface of the optical sheet 125 may be pressed against the rear surface of the display panel 110.

The optical sheet 125 may include at least one or more sheets. Specifically, the optical sheet 125 may include one or more prism sheets and/or one or more diffusion sheets. The plurality of sheets included in the optical sheet 125 may be adhered to each other and/or pressed against each other.

The optical sheet 125 may include a plurality of sheets having different functions. For example, the optical sheet 125 may include first to third optical sheets 125a to 125c. The first optical sheet 125a may have a function of a diffusion sheet, and the second and third optical sheets 125b and 125c may have a function of a prism sheet. The number and/or position of the diffusion sheet and the prism sheet may vary. For example, the optical sheet 125 may include the first optical sheet 125a as the diffusion sheet and the second optical sheet 125b as the prism sheet.

The diffusion sheet may prevent light, emitted from the diffusion plate, from being partially concentrated, thereby obtaining uniform brightness of light. The prism sheet may collect light emitted from the diffusion sheet to cause light to be incident perpendicular to the display panel 110.

The coupling portion 125d may be formed at least at one of edges of the optical sheet 125. The coupling portion 125d may be formed in at least one of the first to third optical sheets 125a to 125c.

The coupling portion 125d may be formed at the edges of the long sides of the optical sheet 125. The coupling portion 125d, formed at the first long side, and the coupling portion 125d formed at the second long side may be asymmetrical to each other. For example, the coupling portion 125d at the first long side and the coupling portion 125 at the second long side may be different in position and/or number from each other.

Figure 4:
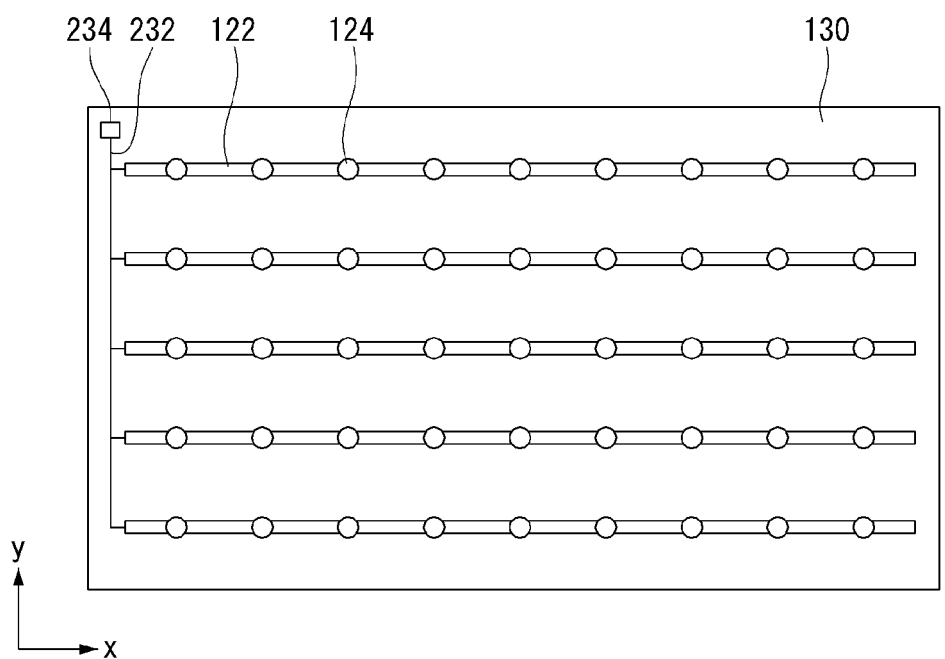

Referring to FIG. 4, the substrate 122 is formed with a plurality of straps extending in a first direction on the frame 130 and being spaced apart from each other at predetermined intervals in a second direction perpendicular to the first direction. A plurality of substrates 122 may be connected at one end to a wiring electrode 232.

The wiring electrode 232 may extend in the second direction. The wiring electrode 232 may be connected to one end of the substrate 122 with a predetermined distance therebetween in the second direction.

A wire hole 234 may be formed at one end of the wiring electrode 232. The wire hole 234 may be a fine hole penetrating through the frame 130. The wiring electrode 232 may extend to a rear surface of the frame 130 through the wire hole 234. The wiring electrode 232 may be electrically connected to an adaptor (not shown), positioned on the rear surface of the frame 130, through the wire hole 234.

The optical assemblies 124 may be mounted on the substrate 133 at predetermined intervals in the first direction. The diameter of the optical assemblies 124 may be greater than the width of the substrate 122 in the second direction. Accordingly, an outer area of the optical assemblies 124 may extend beyond an area in which the substrate 122 is not provided.

Figure 5:
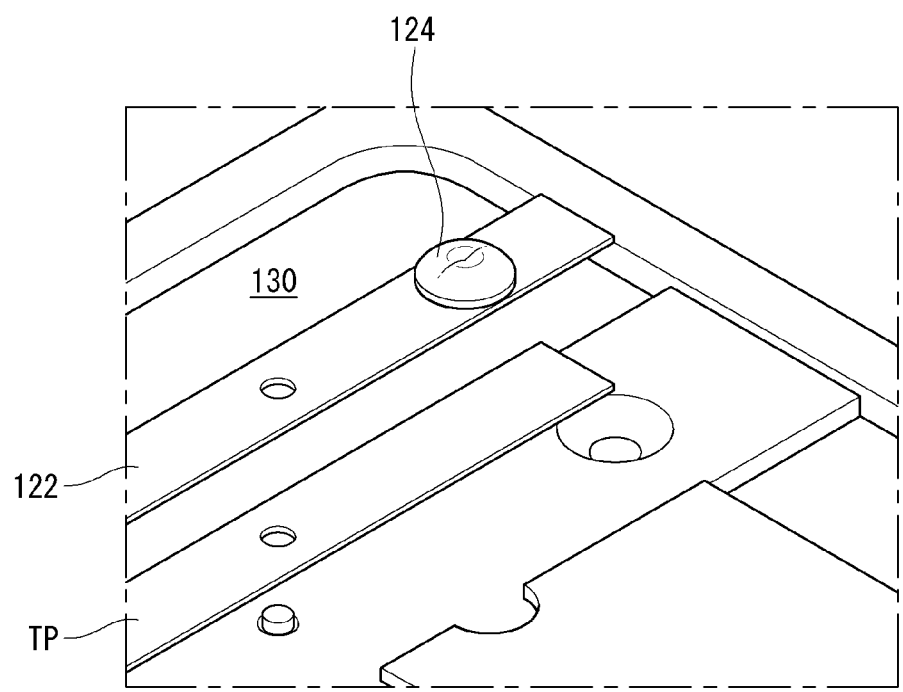

Referring to FIG. 5, the substrate 122 may be coupled to the front surface of the frame 130. The optical assemblies 124 may be mounted on the substrate 122. An adhesive member TP may be interposed between the substrate 122 and the front surface of the frame 130.

The adhesive member TP may be fixed to the front surface of the frame 130, and the substrate 122 may be fixed to the adhesive member TP. For example, the adhesive member TP may be a double-sided tape. In this case, the front surface of the frame may not be a flat surface. The frame 139 may be pressed so that components of the display device 100 may be mounted therein, or so as to provide required rigidity to the display device 100. Accordingly, the front surface of the frame 130 may not be flat surface.

As the front surface of the frame 130 is not flat, the substrate 122 fixed to the adhesive member TP may be lifted or separated from the adhesive member TP, leading to a problem in that heat generated in the optical assemblies 124 may not be dissipated smoothly. That is, heat generated in the optical assemblies 124 may be dissipated by being transferred to the frame 130 through the substrate 122, but if a contact area between the substrate 122 and the frame 130 decreases or if the substrate 122 is separated from the frame 130, a problem may occur in the dissipation of heat generated in the optical assemblies 124.

In addition, if the substrate fixed on the frame 130 with the adhesive member TP is separated due to damage to the optical assemblies 124 and/or the substrate 122, there is a problem in that the optical assemblies 124 and/or the substrate 122 may not be reused.

Figure 6:
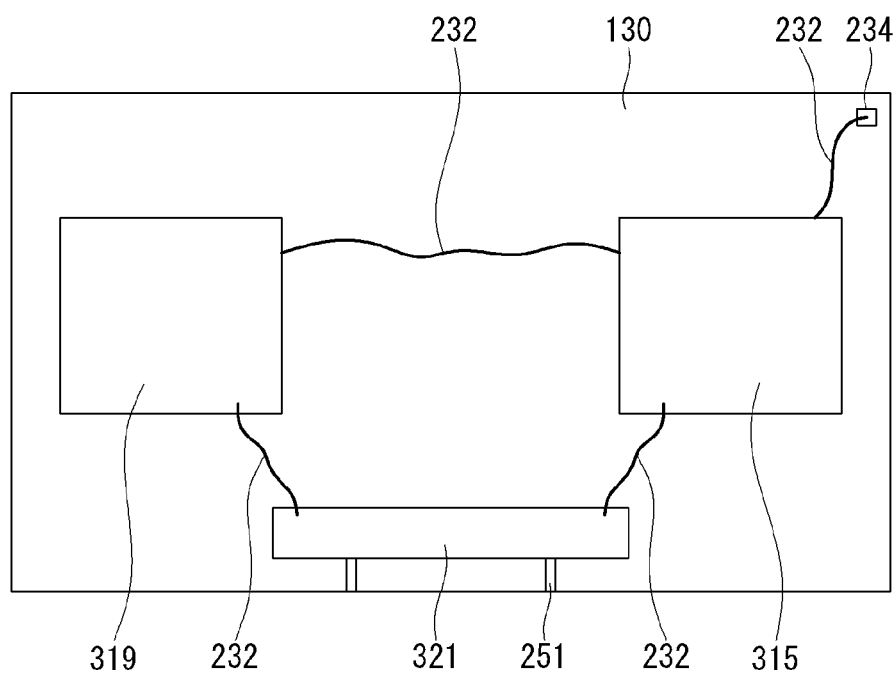

Referring to FIG. 6, the wiring electrode 232, extending from the front surface of the frame 130 through the wire hole 234, may be connected to one side of a power supply 315. The power supply 315 may be a printed circuit board (PCB) supplying power to the display device 100. The power supply 315 may transform an AC frequency into a DC frequency.

The power supply 315 may allow the optical assemblies 124, disposed on the front surface of the frame 130, to emit light through the wiring electrode 232. The power supply 315 may be connected on the other side to a main board 321 through the wiring electrode 232. The main board 321 may be spaced apart from the power supply 315 by a predetermined distance. For example, the main board 321 and the power supply 315 may face each other in the second direction with respect to a center of the frame 130.

The main board 321 may be a PCB providing an interface for operating the display device 100. Further, the main board 321 may check and manage an operating state of each component of the display device 100.

The main board 321 and the power supply 315 may be electrically connected to a T-CON board 319 through the wiring electrode 232. The T-CON board 319 may be a PCB transmitting power or signals, input from the main board 321 or the power supply 315, to the display panel 110. The T-CON board 319 may be electrically connected to the display panel 110 on the front surface of the frame 130 through a flat flex cable 251 (FFC).

Although FIG. 6 illustrates an example in which the respective PCBs are connected to each other, but the present disclosure is not limited thereto, and only at least some of the PCBs may be connected to each other.

Figure 7:
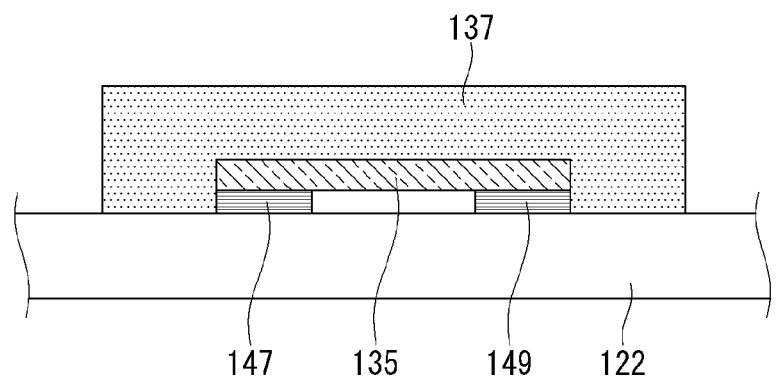

Referring to FIG. 7, the light source 203 may be of a chip-on-board (COB) type. The COB-type light source 203 may include at least one of a light-emitting layer 135, first and second electrodes 147 and 149, and a fluorescent layer 137.

The light-emitting layer 135 may be mounted on the substrate 122. The light-emitting layer 135 may emit light of any one of blue, red, and green. The light-emitting layer 135 may include any one of Firpic, (CF3ppy)2Ir(pic), 9,10-di (2-naphthyl)anthracene(AND), Perylene, distyrybiphenyl, PVK, OXD-7, UGH-3(Blue), and a combination thereof.

The first and second electrodes 147 and 149 may be disposed on both sides of a lower surface of the light-emitting layer 135. The first and second electrodes 147 and 149 may transmit an external driving signal to the light-emitting layer 135.

The fluorescent layer 137 may cover the light-emitting layer 135 and the first and second electrodes 147 and 149. The fluorescent layer 137 may contain a fluorescent material for converting light of a spectrum, generated by the light-emitting layer 135, into white light. The thickness of the light-emitting layer 135 may be uniform at an upper side of the fluorescent layer 137. The fluorescent layer 137 may have a refractive index of 1.4 to 2.0.

Figure 8:
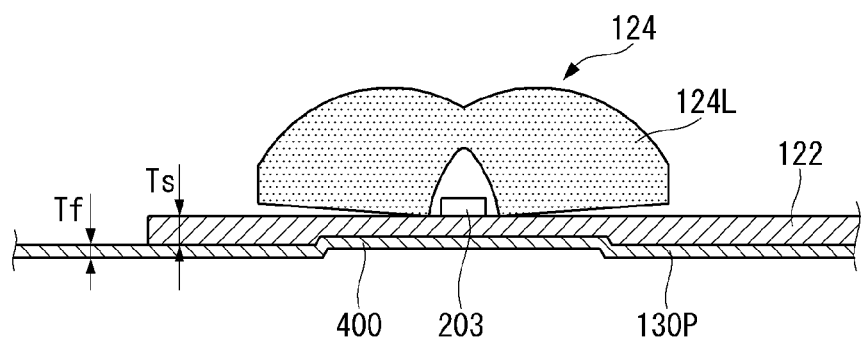

Referring to FIG. 8, the substrate 122 may entirely come into contact with a flat plate part 130P. A heat dissipation protrusion 400 may be formed by pressing the frame 130. The heat dissipation protrusion 400 may be formed by pressing the flat plate part 130P. For example, as the heat dissipation protrusion 400 protrudes from a front surface of the flat plate part 130P, a rear surface of the flat plate part 130P may be recessed.

Accordingly, the lower surface of the substrate 122, on which the optical assemblies 124 are positioned, and the flat plate part 130P of the frame 130 may be maintained in a contact state. In other words, heat generated in the optical assemblies 124 or the light source 203 may be transferred to the heat dissipation protrusion 400 through the substrate 122, to be dissipated through the flat plate part 130P.

A thickness Tf of the flat plate part 130P may be thinner than a thickness Ts of the substrate 122. As the thickness Tf of the flat plate part 130P is thinner than the thickness Ts of the substrate 122, heat transfer or heat dissipation may take place effectively.

Figure 9:
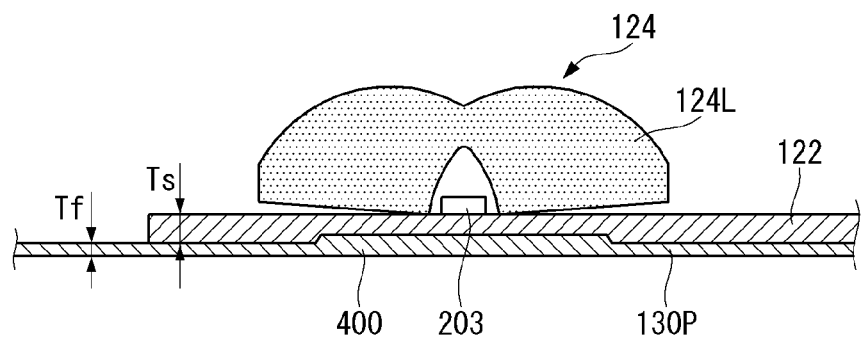

Referring to FIG. 9, the heat dissipation protrusion 400 may protrude from the front surface of the flat plate part 130P. In this case, the rear surface of the flat plate part 130P, on which the heat dissipation protrusion 400 is positioned, may be a flat surface. For example, the heat dissipation protrusion 400 may protrude outwardly from the front surface of the flat plate part 130P of the frame 130, without deforming the rear surface of the flat plate part 130P of the frame 130.

Accordingly, heat absorption capacity of the frame 130 at a portion where the heat dissipation protrusion 400 is formed may be improved. The thickness Tf of the flat plate part 130P may be thinner than the thickness Ts of the substrate 122. As the thickness Tf of the flat plate part 130P is thinner than the thickness Ts of the substrate 122, heat transfer or heat dissipation may take place effectively.

Figure 10:
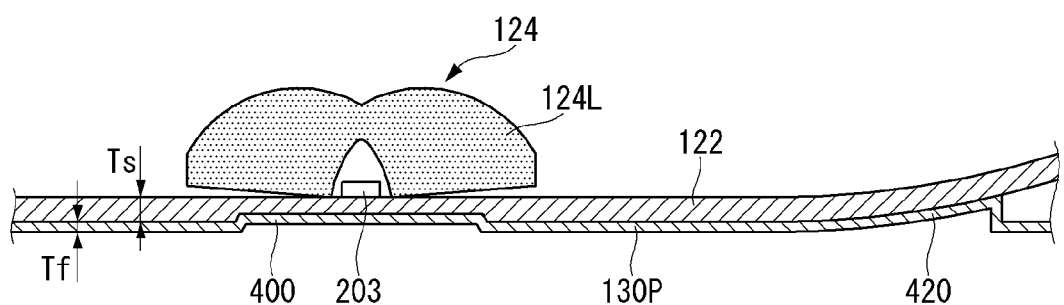

Referring to FIG. 10, an inclined protrusion 420 may be disposed on a lower part of the substrate 122. The inclined protrusion 420 may provide inclination to one end of the substrate 122. The inclined protrusion 420 may be spaced apart from the heat dissipation protrusion 400. The inclined protrusion 420 may have a height higher than a height of the heat dissipation protrusion 400.

Accordingly, the substrate 122 may entirely come into contact with the flat plate part 130P. By using the inclined protrusion 420, the substrate 122 may come into contact with the heat dissipation protrusion 400 regardless of the bending of the frame 130.

The inclined protrusion 420 may be formed by pressing the frame 130. The inclined protrusion 420 may be formed by protruding the front surface of the flat plate part 130P of the frame 130. In this case, the rear surface of the flat plate part 130P of the frame 130 may be recessed.

Figure 11:
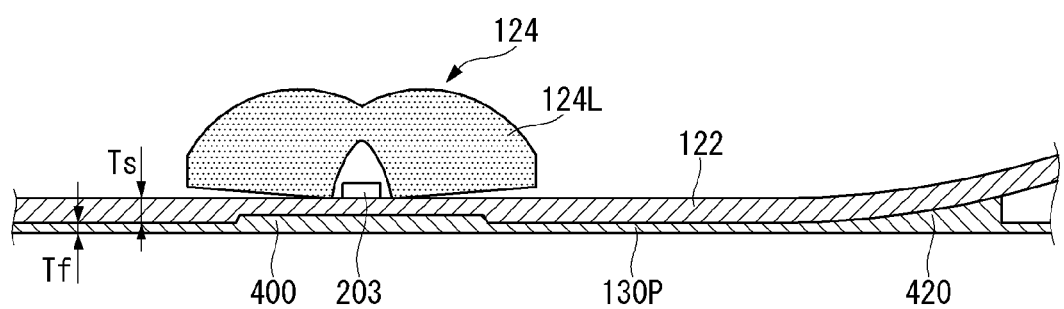

Referring to FIG. 11, the inclined protrusion 420 may be disposed at a lower portion of the substrate 122. The inclined protrusion 420 may provide inclination to one end of the substrate 122. The inclined protrusion 420 may be spaced apart from the heat dissipation protrusion 400. The inclined protrusion 420 may have a height higher than the height of the heat dissipation protrusion 400.

Accordingly, the substrate 122 may entirely come into contact with the flat plate part 130P. By using the inclined protrusion 420, the substrate 122 may come into contact with the heat dissipation protrusion 400 regardless of the bending of the frame 130.

The inclined protrusion 420 may protrude from the front surface of the flat plate part 130P. In this case, a rear surface of the flat plate part 130P, on which the inclined protrusion 420 is disposed, may be a flat surface. That is, the inclined protrusion 420 protrudes outwardly from the front surface of the flat plate part 130P of the frame 130, without deforming the rear surface of the flat plate part 130P of the frame 130.

Figure 12:
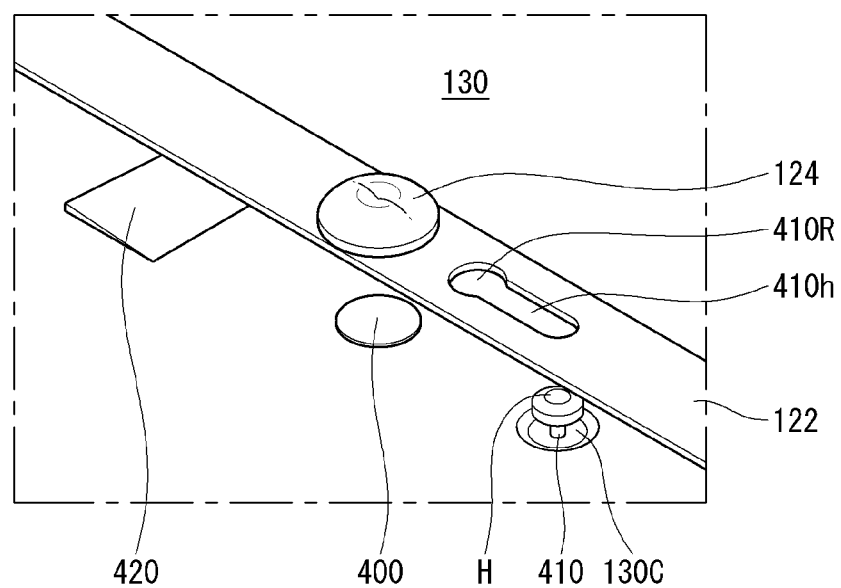
Figure 13:
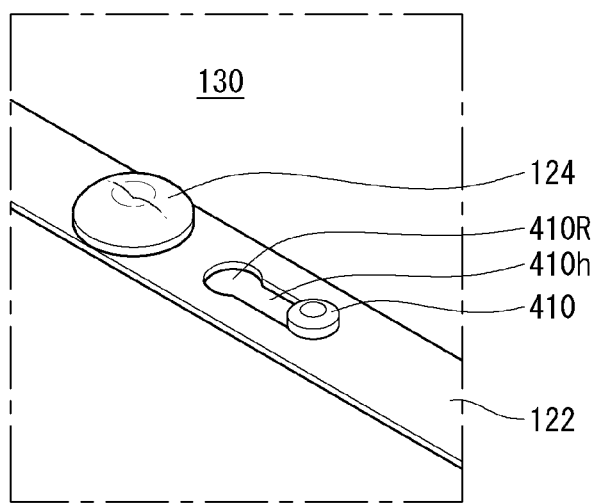

Referring to FIGS. 12 and 13, the inclined protrusion 420 may be disposed on one side of the heat dissipation protrusion 400. By providing inclination to the substrate 122, the inclined protrusion 420 may allow the lower surface of the substrate 122, on which the optical assemblies 124 are disposed, to come into contact with the heat dissipation protrusion 400. A coupling protrusion 410 may be disposed on the other side of the heat dissipation protrusion 400.

A depression 130C may be formed at the flat plate part 130P. The depression 130C may be referred to as a recess 130C. The coupling protrusion 410 may be disposed at the depression 130C formed at the flat plate part 130P. That is, an entire height of the coupling protrusion 410 is covered by the depression 130C, such that the substrate 122 may be disposed closer to the frame 130.

The coupling protrusion 410 may have a head H. The substrate 122 may have a hole 410R and a slot 410*h*. The slot 410*h* may be coupled to one end of the hole 410R. A width of the slot 410*h* may be smaller than a diameter of the head H. A diameter of the hole 410R may be equal to or greater than the diameter of the head H. The width of the slot 410*h* may be smaller than the diameter of the head H.

As the head H is inserted into the hole 410R, and the substrate 122 slides, the head H may move on the slot 410*h*. The head H may be disposed at the end of the slot 410*h*, such that the substrate 122 may be fixed to the frame 130.

The coupling protrusion 410 formed in the depression 130C may allow the lower surface of the substrate 122 to come into contact with the frame 130, the flat plate part 130P, and/or the heat dissipation protrusion 400 more effectively.

A crack may appear on the substrate 122 due to the hole 410R and the slot 410*h* which are formed on the substrate 122, such that the substrate 122 may be separated from the frame 130, causing a failure in a backlight unit.

Figure 14:
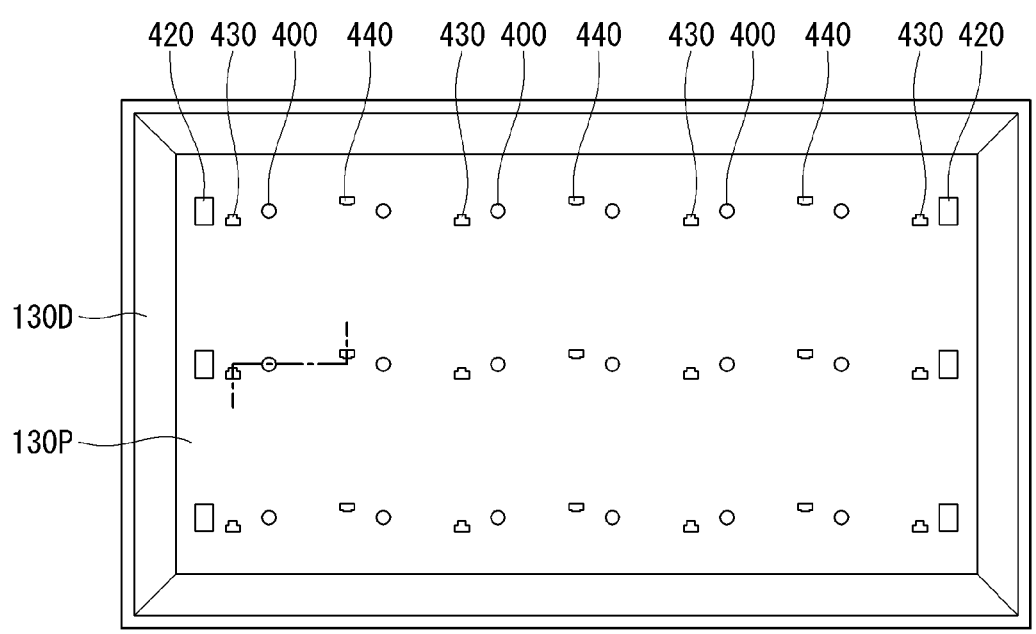
Figure 15:
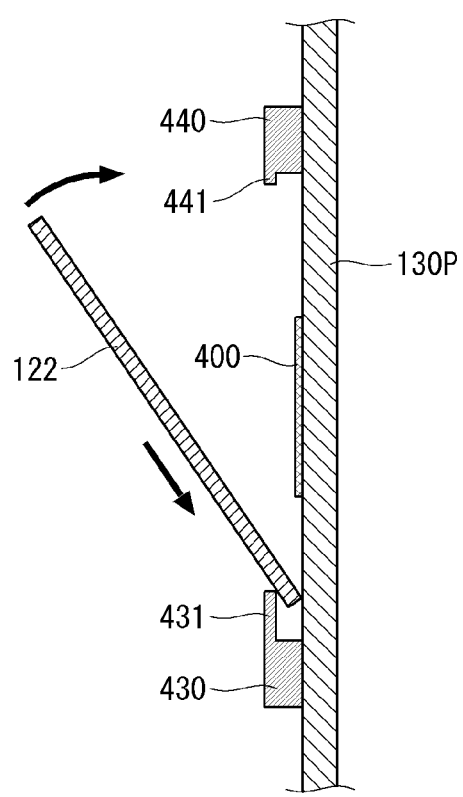
Figure 16:
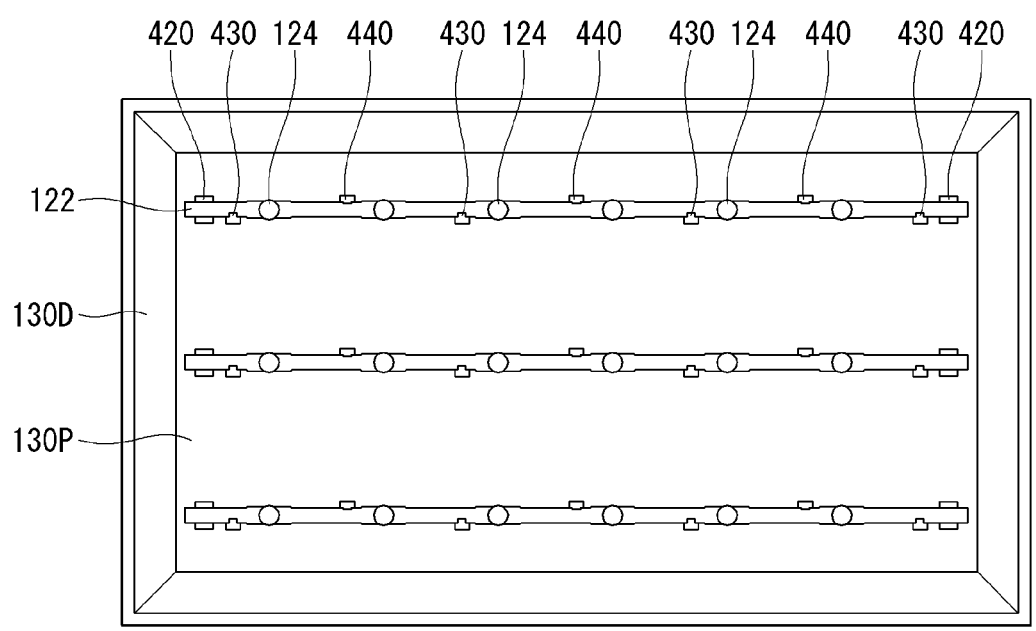

Referring to FIGS. 14 to 16, a first holder 430 may be disposed at the frame 130. The first holder 430 may be disposed at the flat plate part 130P. The first holder 430 may be formed at the flat plate part 130P. The first holder 430 may have a protruding portion 431. The first holder 430 may be fixed to the flat plate part 130P. The protruding portion 431 may protrude outwardly from the first holder 430. One side of the substrate 122 may be mounted on the first holder 430. The one side of the substrate 122 may be inserted into the first holder 430. The one side of the substrate 122 may be supported by the first holder 430 and the protruding portion 431.

A second holder 440 may be disposed at the frame 130. The second holder 440 may be disposed at the flat plate part 130P. The second holder 440 may be formed at the flat plate part 130P. The second holder 440 may have a protruding portion 441, which may face the protruding portion 431 of the first holder 430. That is, if the protruding portion 431 of the first holder 430 faces upward, the protruding portion 441 of the second holder 440 may face downward; and if the protruding portion 431 of the first holder 430 faces downward, the protruding portion 441 of the second holder 440 may face upward. Accordingly, the substrate 122 may be fixed on the frame 130 by the first holder 430 and the second holder 440.

In this case, the second holder 440 may be disposed alternately with the first holder 430. The heat dissipation protrusion 400 may be interposed between the first holder 430 and the second holder 440. From the point of view in an up-down direction of the frame 130, when the first holder 430 is disposed at an upper side with respect to the substrate 122, and the second holder 440 is disposed at a lower side with respect to the substrate 122, the heat dissipation protrusion 400 may be interposed between the first holder 430 and the second holder 440. From another point of view, the first holder 430, the second holder 440, and/or the heat dissipation protrusion 400 may be disposed alternately in a left-right direction of the frame 130.

Accordingly, the substrate 122 may be not only fixed to the frame 130, but also come into contact with the heat dissipation protrusion 400 regardless of flatness of the frame 130. That is, heat generated in the optical assemblies 124 may be dissipated effectively through the frame 130.

The first and second holders 430 and 440 may be formed by pressing the frame 130. As the first and second holders 430 and 440 are formed, holes may be formed in the frame 130. As light may leak to the outside or foreign matter may be introduced through the holes formed in the frame 130, a failure may occur in a backlight unit.

Figure 17:
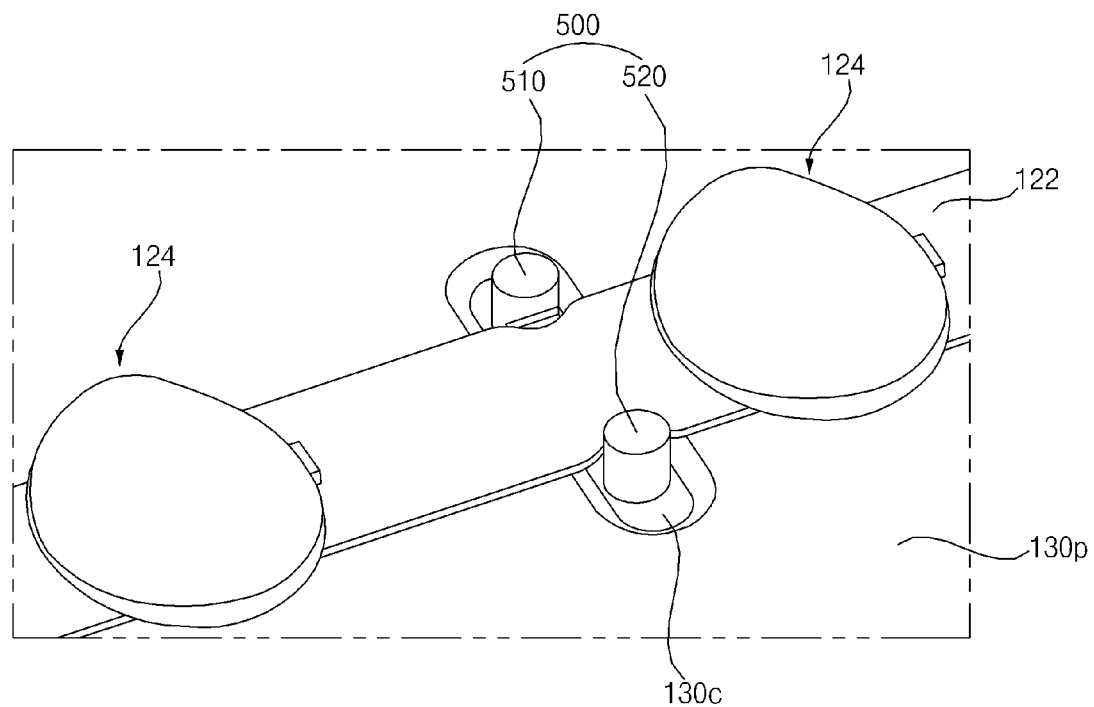
Figure 18:
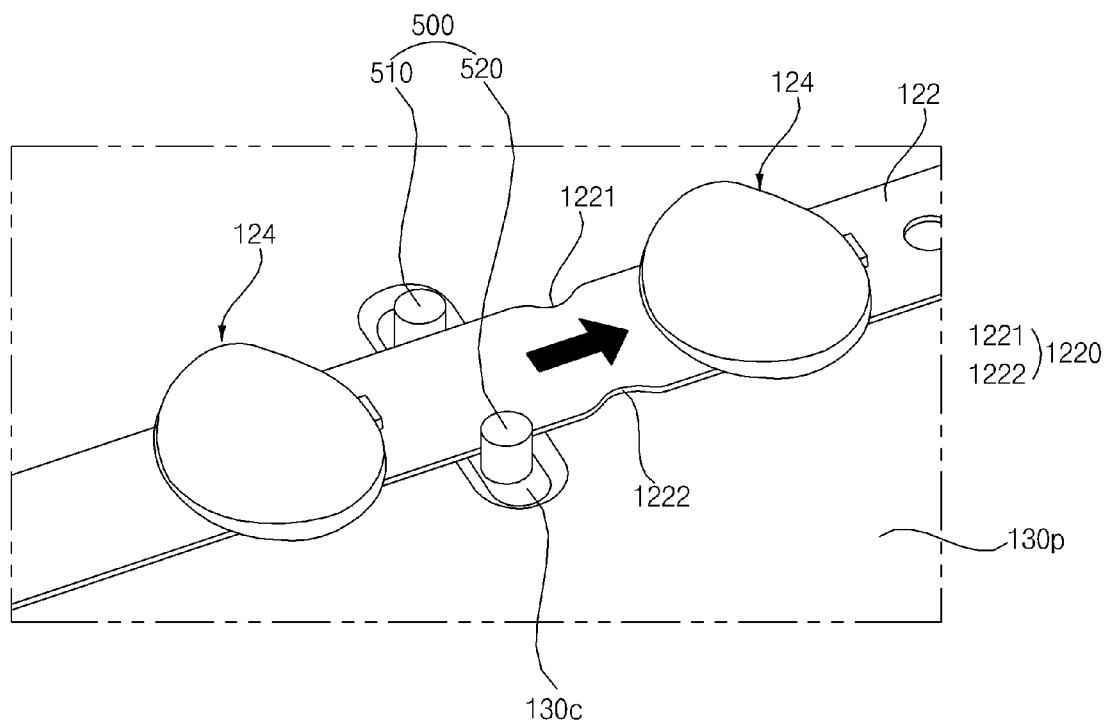

Referring to FIGS. 17 and 18, a coupling protrusion 500 may be formed on the depression 130C. The depression 130C may be elongated in a direction intersecting a longitudinal direction of the substrate 122. The coupling protrusion 500 may include a first coupling protrusion 510 and a second coupling protrusion 520. The first coupling protrusion 510 may be disposed adjacent to one end of the depression 130C, and the second coupling protrusion 520 may be disposed adjacent to the other end of the depression 130C. The first coupling protrusion 510 may be symmetrical to the second coupling protrusion 520 with respect to the substrate 122.

The substrate 122 may have a cut-out 1220. The cut-out 1220 may be formed on the long side of the substrate 122. The cut-out 1220 may be referred to as a substrate groove 1220. The cut-out 1220 may include a first cut-out 1221 and the second cut-out 1222. The first cut-out 1221 may be formed on one long side of the substrate 122, and the second cut-out 1222 may be formed on the other long side of the substrate 122. The first cut-out 1221 may be symmetrical to the second cut-out 1222 with respect to the substrate 122. The one long side of the substrate 122 may be referred to as a first elongated side of the substrate 122, and the other long side of the substrate 122 may be referred to as a second elongated side of the substrate 122.

In the substrate 122, the cut-out 1220 is aligned with the coupling protrusion 500 and is pressed against the flat plate part 130C, so as to move in a longitudinal direction of the substrate 122. As the substrate 122 slides, the cut-out 1220 may be fixed to the coupling protrusion 500. The coupling protrusion 500 may be referred to as a coupling member 500, a substrate guide 500, or the holder 500.

Figure 19:
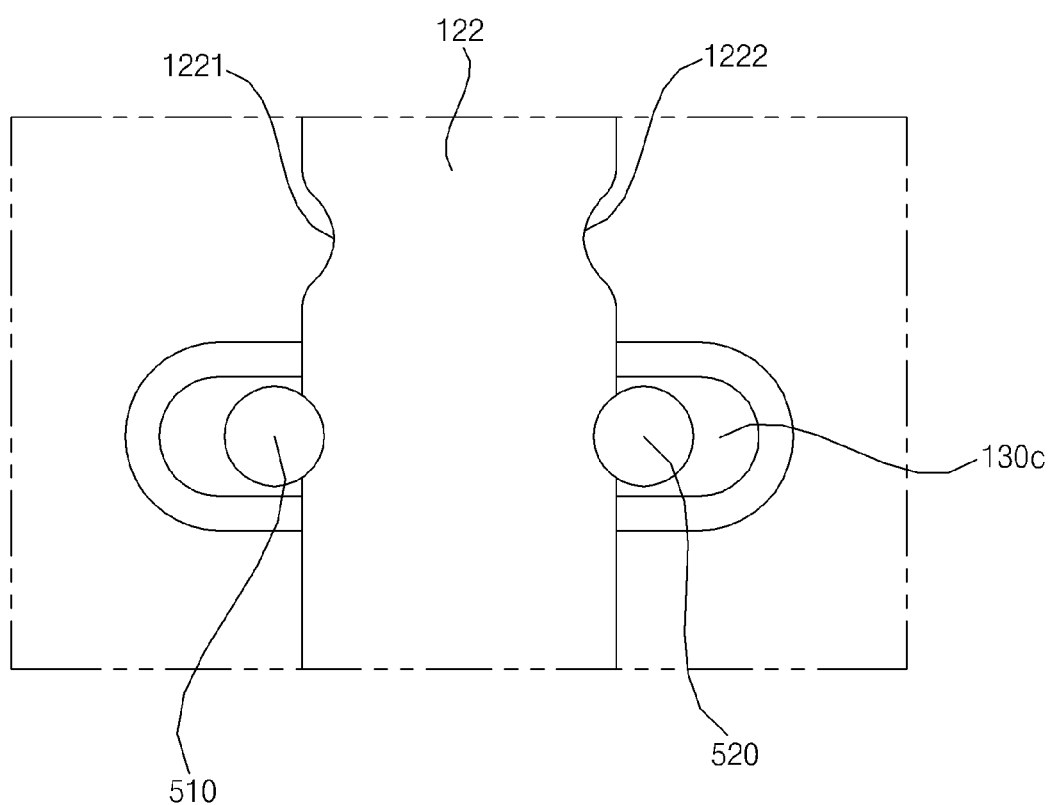
Figure 20:
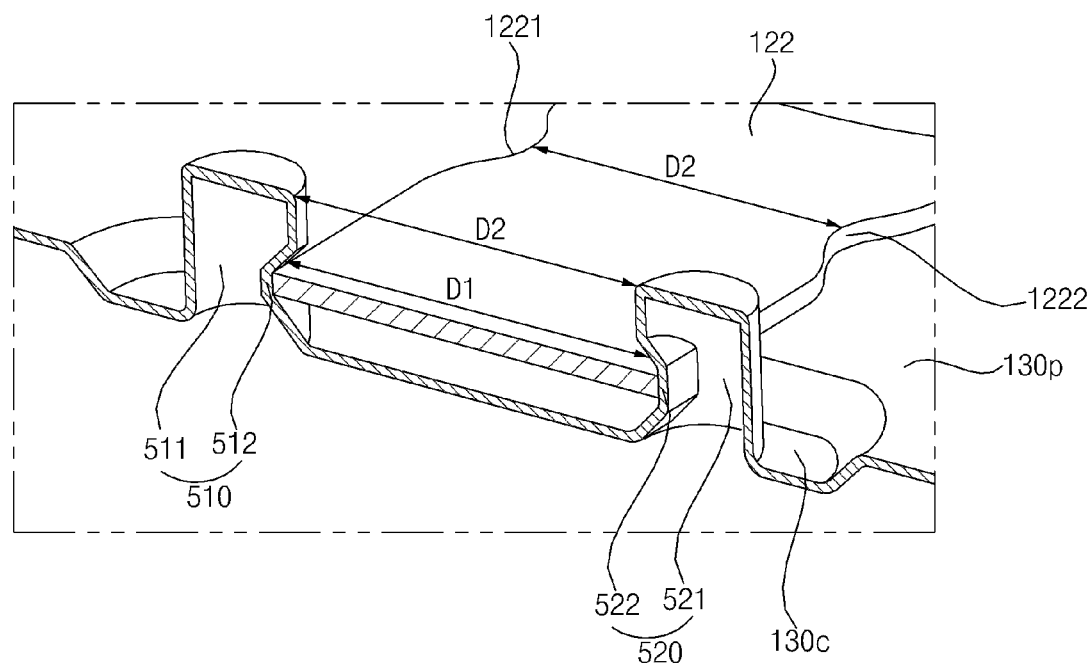

Referring to FIGS. 19 and 20, the first coupling member 510 may have a column 511 and a groove 512. The column 511 may be formed by pressing the depression 130C. For example, the column 511 may be a cylinder with one closed end. The groove 512 may be formed on a side surface of the column 511. The groove 512 may be recessed inwardly of the column 511. The column 511 may be referred to as a protrusion 511.

The second coupling member 520 may have a column 521 and a groove 522. The column 521 may be formed by pressing the depression 130C. For example, the column 521 may be a cylinder with one closed end. The groove 522 may be formed on a side surface of the column 521. The groove 522 may be recessed inwardly of the column 521. The column 521 may be referred to as a protrusion 521.

The groove 522 of the second coupling member 520 may face the groove 512 of the first coupling member 510. A first distance D1 between the groove 512 of the first coupling member 510 and the groove 522 of the second coupling member 520 may correspond to the width of the substrate 122. For example, the first distance D1 may be substantially equal to or slightly smaller than the width of the substrate 122. After being inserted into the grooves 512 and 522, the substrate 122 may slide while rubbing against the grooves 512 and 522.

A second distance D2 between the column 511 of the first coupling member 510 and the column 521 of the second coupling member 520 may be smaller than the width of the substrate 122. The second distance D2 may be a distance between a tangent line of the column 511 of the first coupling member 510 and a tangent line of the column 521 of the second coupling member 520. The second distance D2 may correspond to the distance D2 between the first cut-out 1221 and the second cut-out 1222. For example, the second distance D2 may be substantially equal to or slightly greater than the distance between the first cut-out 1221 and the second cut-out 1222.

Figure 21:
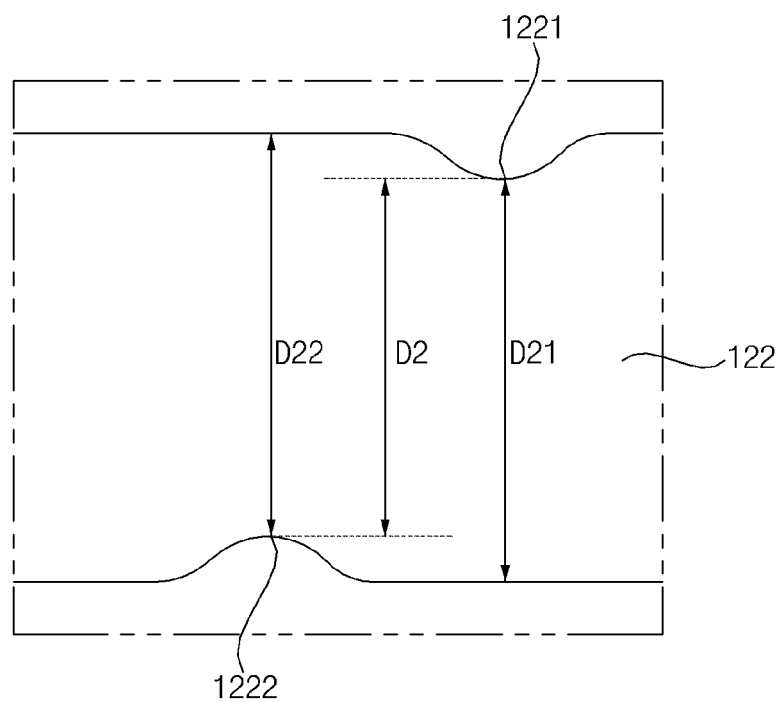

Referring to FIG. 21, the first cut-out 1221 may be formed on one long side of the substrate 122. The second cut-out 1222 may be formed on the other long side of the substrate 122. The first cut-out 1221 may be asymmetrical to the second cut-out 1222 with respect to the longitudinal direction of the substrate 122. A 21st distance D21 between the first cut-out 1221 and the other long side of the substrate 122 may be substantially equal to a 22nd distance D22 between the second cut-out 1222 and the one long side of the substrate 122. The 21st distance D21 may be greater than the second distance D2, and the 22nd distance D22 may be greater than the second distance D2.

Figure 22:
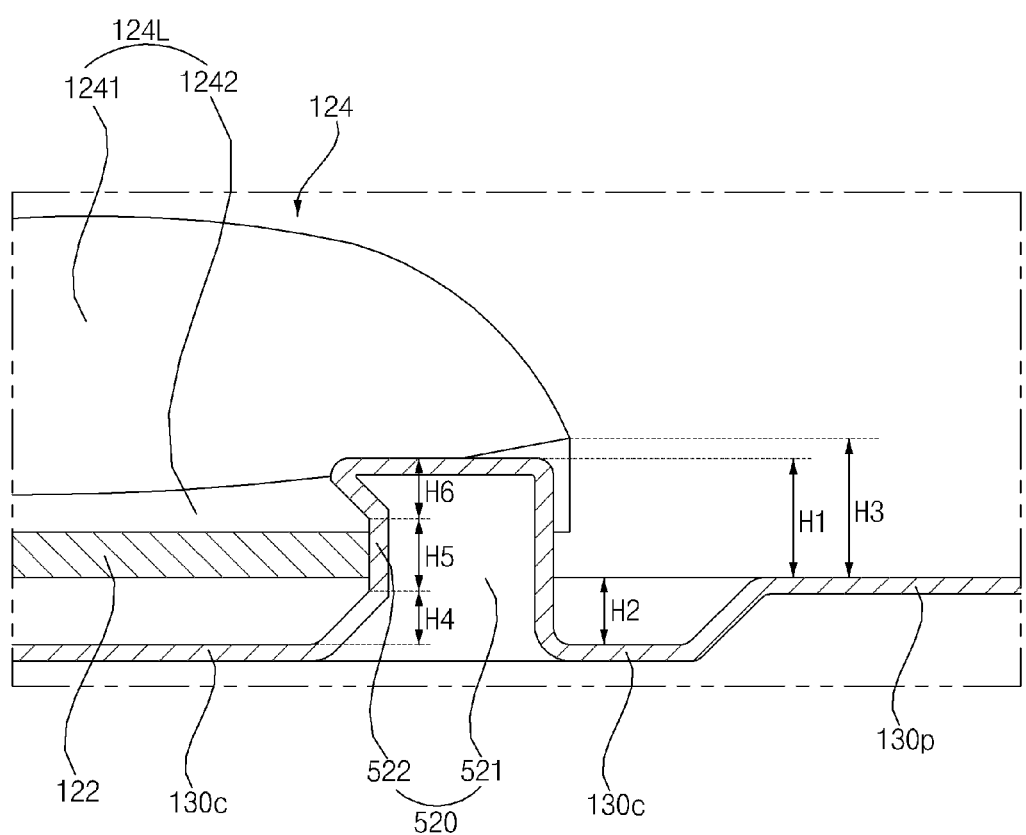

Referring to FIG. 22, a first height H1 may be a height from the flat plate part 130P to the upper end of the column 521. A second height H2 may be a height from the depression 130C to the flat plate part 130P. The height of the column 521 may be a sum of the first height H1 and the second height H2.

A lens 124L may have a side portion 1242 and a dome portion 1241. The side portion 1242 may form a lower part of the lens 124L. The side portion 1242 may have an overall disk shape. The dome portion 1241 may be formed on the side portion 1242. The dome portion 1241 may have an overall elliptical or semi-circular shape. The lens 124L may be solid with a filled interior. A third height H3 may be a height from the flat plate part 130P to an upper end of the side portion 1242 or a height from the flat plate part 130P to a lower end of the dome portion 1241. The third height H3 may be a distance from the flat plate part 130P to a highest height of the side portion 1242.

The first height H1 may be smaller than the third height H3, such that a path of light emitted to the outside through the lens 124L may not be blocked.

A fourth height 4 may be a height from the lower end of the column 521 to the lower end of the groove 522. A sixth height H6 may be a height from the upper end of the column 521 to the upper end of the groove 522. A fifth height H5 may be a height of the groove 522. The height H1+H2 of the column 521 may be a sum of the fourth height H4, the fifth height H5, and the sixth height H6.

The fourth height H4 may be smaller than the second height H2. The fifth height H5 may be substantially equal to or slightly greater than a thickness of the substrate 122. The sixth height H6 may be substantially equal to the fourth height H4, such that not only the substrate 122 may come into contact with the flat plate part 130P, but also a path of light, emitted to the outside, may not be blocked.

Figure 23:
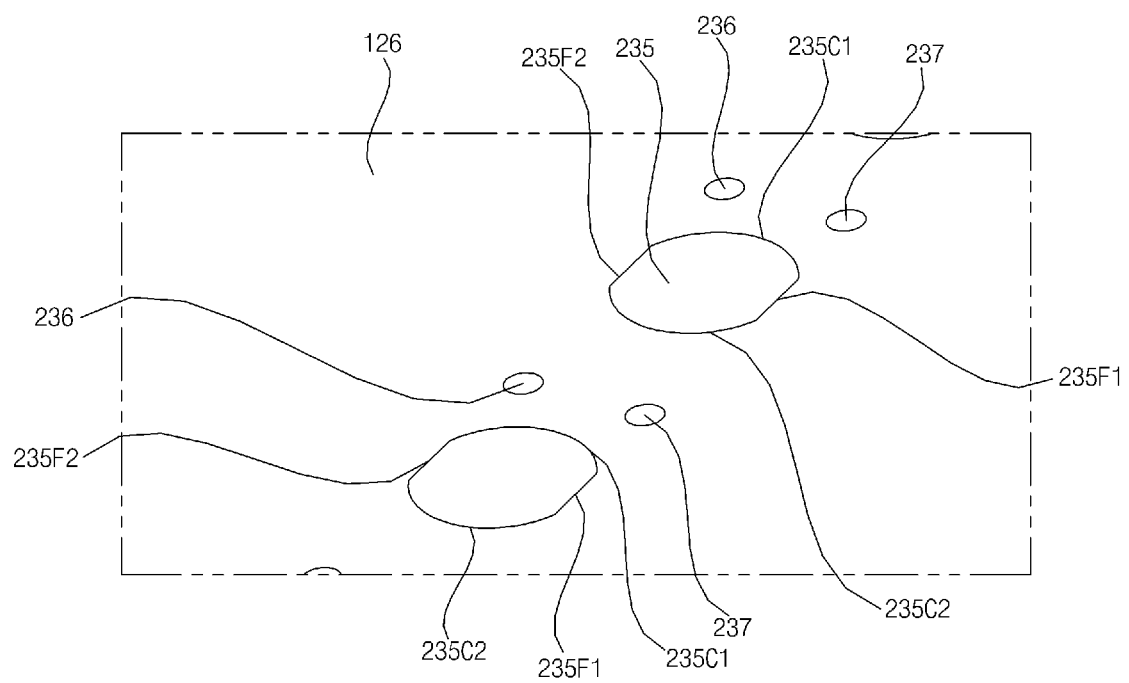
Figure 24:
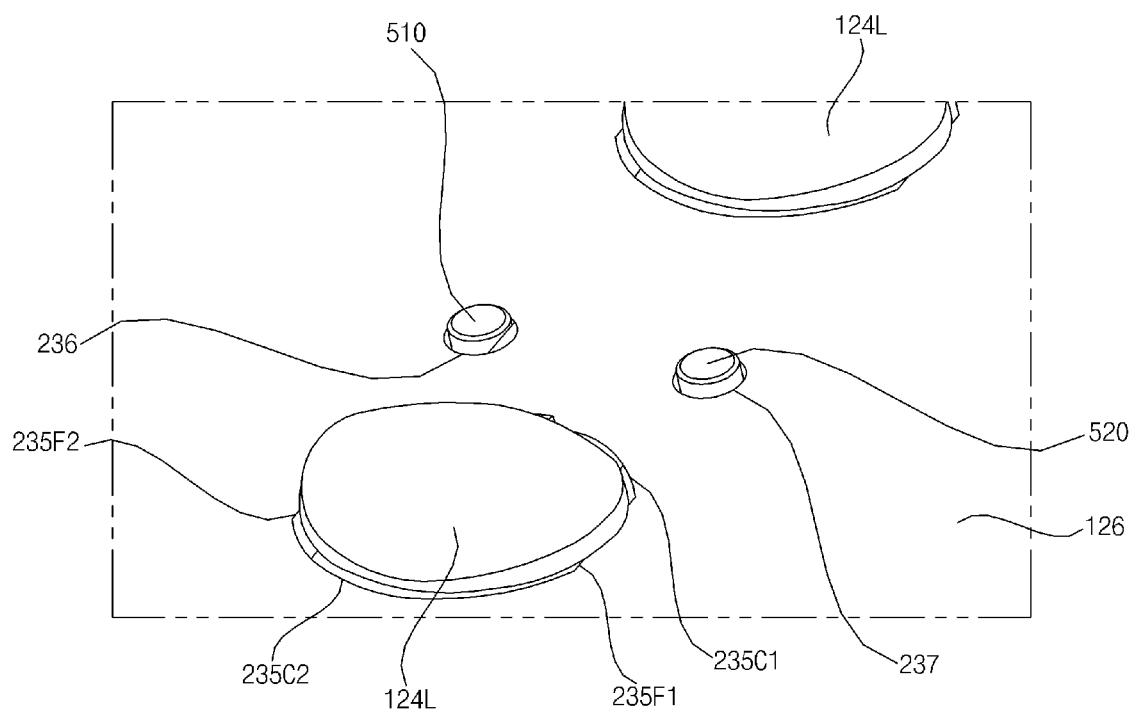
Figure 25:
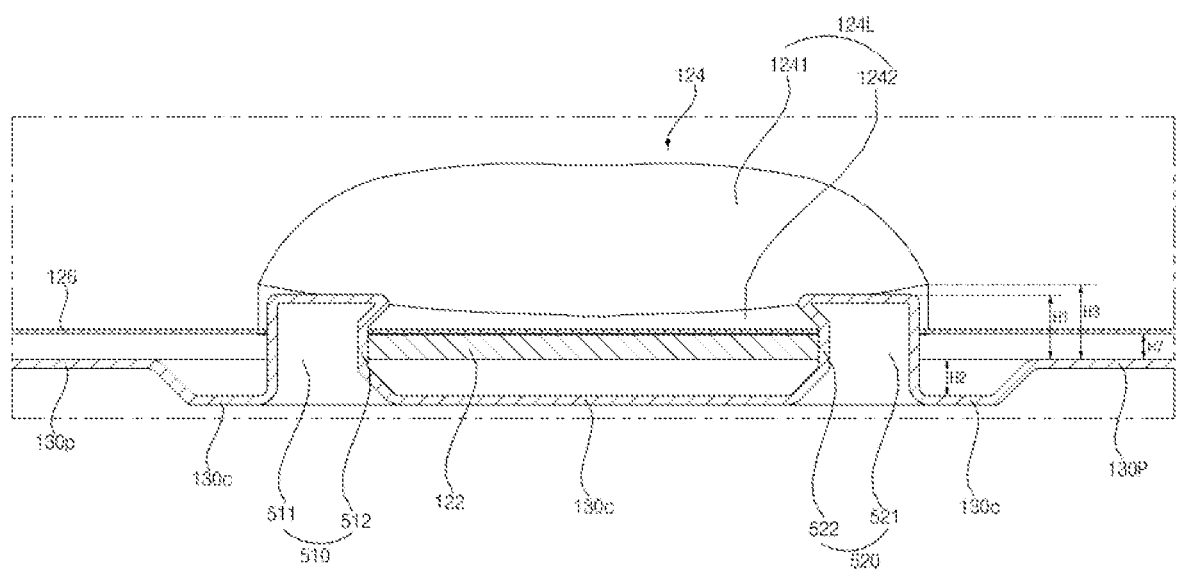

Referring to FIGS. 23 to 25, the reflective sheet 126 may have a lens hole 235 and accommodating holes 236 and 237. When the reflective sheet 126 is placed on the substrate 122 (see FIG. 22), the lens 124L may pass through the lens hole 235, and the coupling members 510 and 520 may pass through the accommodating holes 236 and 237.

The lens hole 235 may have horizontal portions 235F1 and 235F2 and circular portions 235C1 and 235C2, and may have an overall elliptical shape. The horizontal portions 235F1 and 235F2 may be referred to as straight line portions 235F1 and 235F2, and the circular portions 235C1 and 235C2 may be referred to as curved line portions 235C1 and 235C2. The horizontal portions 235F1 and 235F2 may be disposed opposite to each other while facing each other, and the circular portions 235C1 and 235C2 may be disposed opposite to each other while facing each other. The first circular portion 235C1 may connect one end of the first horizontal portion 235F1 and one end of the second horizontal portion 235F2. The second circular portion 235C2 may connect the other end of the first horizontal portion 235F1 and the other end of the second horizontal portion 235F2.

The first accommodating hole 237 may be disposed adjacent to the first circular portion 235C1 and the first horizontal portion 235F1, and the second accommodating hole 236 may be disposed adjacent to the second circular portion 235C2 and the second horizontal portion 235F2.

When the lens 124L is placed on the lens hole 235, the lens 124L may press the first horizontal portion 235F1 and/or the second horizontal portion 235F2, thereby preventing the reflective sheet 126 from being partially lifted.

A seventh height H7 may be a height from the flat plate part 130P to the reflective sheet 126. The seventh height H7 may be substantially equal to or slightly greater than the thickness of the substrate 122. The seventh height H7 may be smaller than the first height H1.

Figure 26:
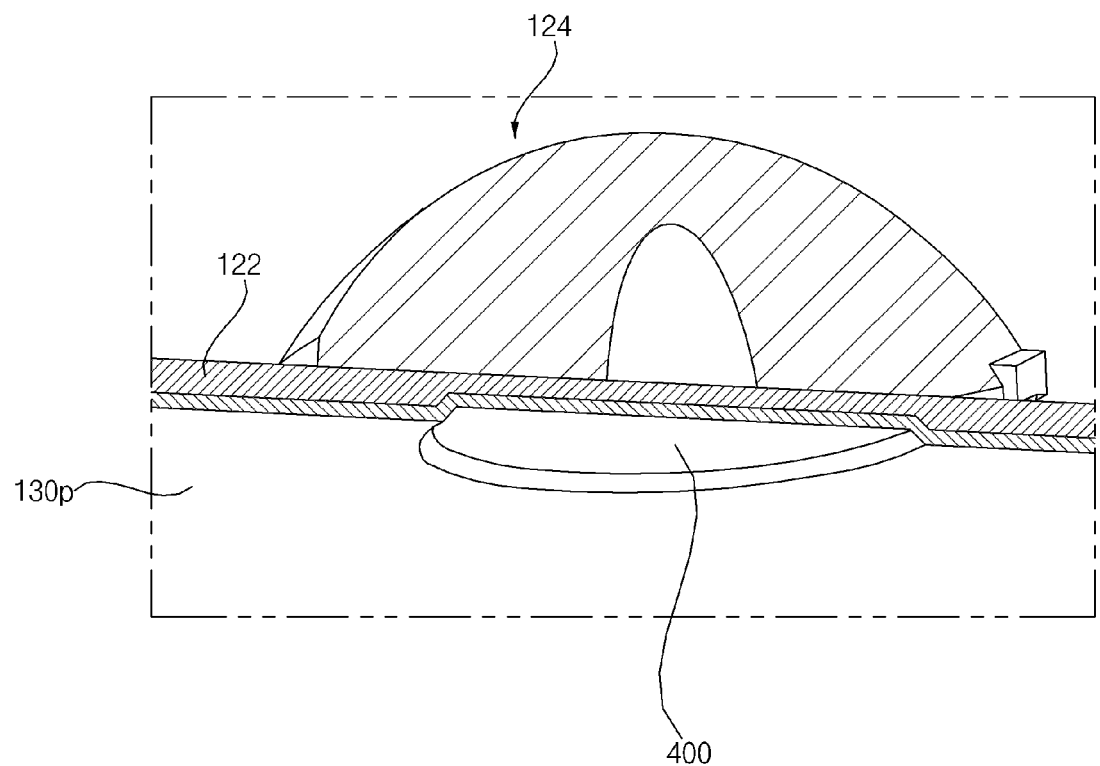

Referring to FIG. 26, the substrate 122 may entirely come into contact with the flat plate part 130P. The heat dissipation protrusion 400 may be formed by pressing the frame 130. The heat dissipation protrusion 400 may be formed by pressing the flat plate part 130P. For example, as the heat dissipation protrusion 400 protrudes from the front surface of the flat plate part 130P, the rear surface of the flat plate part 130P may be recessed.

Accordingly, the lower surface of the substrate 122, on which the optical assemblies 124 are disposed, and the flat plate part 130P of the frame 130 may be maintained in a contact state. In other words, heat generated in the optical assemblies 124 or the light source 203 may be transferred to the heat dissipation protrusion 400 through the substrate 122, to be dissipated through the flat plate part 130P.

Figure 27:
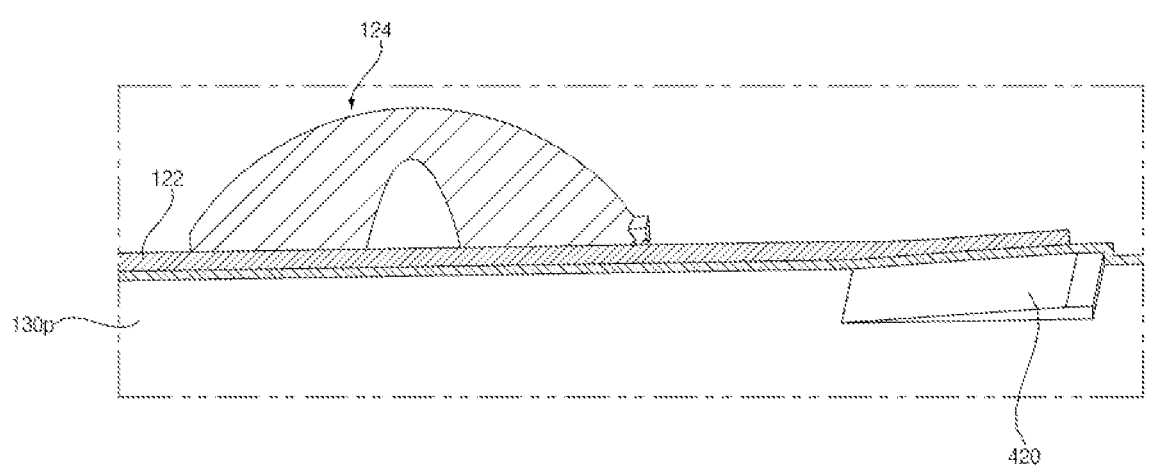

Referring to FIG. 27, the inclined protrusion 420 may be disposed at a lower portion of the substrate 122. The inclined protrusion 420 may provide inclination to one end of the substrate 122.

Accordingly, the substrate 122 may entirely come into contact with the flat plate part 130P. By using the inclined protrusion 420, the substrate 122 may come into contact with the flat plate part 130P regardless of the bending of the frame 130.

The inclined protrusion 420 may be formed by pressing the frame 130. The inclined protrusion 420 may be formed by protruding the front surface of the flat plate part 130P of the frame 130. In this case, the rear surface of the flat plate part 130P of the frame 130 may be recessed.

Accordingly, heat generated in the optical assemblies 124 may be dissipated through the flat plate part 130P.

In accordance with an aspect of the present disclosure, provided is a display device including: a display panel 110; a frame 130 positioned behind the display panel; a substrate 122 having an elongated shape and coupled to the frame 130; an optical assembly 124 mounted on the substrate 122 and configured to provide light to the display panel 110; and a plurality of holders 500 connecting or coupling the substrate 122 to the frame 130, wherein the plurality of holders 500 includes: a first holder 510 disposed adjacent to a first elongated side of the substrate 122 and holding the substrate 122; and a second holder 520 disposed adjacent to a second elongated side of the substrate 122 and opposite the first elongated side and positioned opposite to the first holder 510, wherein the first holder and the second holder are configured to secure substrate 122, and holding the substrate 122.

In accordance with another aspect of the present disclosure, each of the first holder 510 and second holder 520 may be configured as a protrusion 511 and 521 protruding from the frame, and wherein the protrusion 511 and 521 may include a recessed groove 512 and 522 positioned at an inner side of the protrusion facing the substrate 122, and wherein the groove 512 and 522 may be configured to accommodate and secure a side of the substrate 122.

In accordance with another aspect of the present disclosure, the substrate 122 may include at least one concave substrate groove 1221 and 1222 formed on elongated sides of the substrate 122.

In accordance with another aspect of the present disclosure, the substrate 122 may include: a first substrate groove 1221 formed on the first elongated side of the substrate 122; and a second substrate groove 1222 formed on the second elongated side of the substrate 122.

In accordance with another aspect of the present disclosure, the first substrate groove 1221 may be symmetrical to the second substrate groove 1222 with respect to the substrate 122.

In accordance with another aspect of the present disclosure, the first substrate groove 1221 may be asymmetrical to the second substrate groove 1222 with respect to the substrate 122.

In accordance with another aspect of the present disclosure, the frame 130 may include: a plate 130P including an elongated recess 130C aligned in a direction intersecting an alignment direction of the substrate 122, wherein the first holder 510 may be disposed adjacent to one end of the elongated recess 130C; and the second holder 520 may be disposed adjacent to the other end of the elongated recess 130C and opposite to the first holder 510 with respect to the substrate 122, wherein a distance between an upper end of the first holder 510 and an upper end of the second holder 520 may correspond to a width of the substrate 122 between the first substrate groove 1221 and the second substrate groove 1222.

In accordance with another aspect of the present disclosure, a distance between a recessed groove 512 of the first holder 510 and a recessed groove 522 of the second holder 520 may correspond to a width of the substrate without the first substrate groove 1221 and the second substrate groove 1222.

In accordance with another aspect of the present disclosure, the optical assembly 124 may include: a light source 203 mounted on the substrate 122; and a lens 124L covering the light source 203, wherein the lens 124L may include: a side portion 1242 having a cylindrical shape and forming a lower part of the lens 124L; and a dome portion 1241 having a dome shape and forming an upper part of the lens 124L.

In accordance with another aspect of the present disclosure, a distance H1 from the plate 130P to upper ends of the first and second holders 510 and 520 may be less than a distance from the plate 130P to an upper end of the side portion 1242 of the lens 124L.

In accordance with another aspect of the present disclosure, the display device may further include a reflective sheet 126 disposed in front of the substrate 122 and the frame 130, and including a hole 235 through which the lens 124L passes, wherein the hole 235 may include: a first straight side portion 235F1 and a second straight side portion 235F2 opposite to each other; a first curved end portion 235C1 connecting one end of the first straight side portion 235F1 and one end of the second straight side portion 235F2; and a second curved end portion 235C2 connecting the other end of the first straight side portion 235F1 and the other end of the second straight side portion 235F2, wherein the lens 124L may be configured to press against at least one of the first straight side portion 235F1 or the second straight side portion 235F2.

In accordance with another aspect of the present disclosure, the reflective sheet 126 may further include a plurality of accommodating holes 236 and 237 through which the plurality of holders 500 may pass.

In accordance with another aspect of the present disclosure, a distance H7 between the plate 130P and the reflective sheet 126 may be substantially equal to a thickness of the substrate 122.

In accordance with another aspect of the present disclosure, the frame 130 may further include an inclined protrusion 420 disposed adjacent to one end of the substrate 122 and configured to contact a rear surface of the substrate 122.

In accordance with another aspect of the present disclosure, a protrusion height of the inclined protrusion 420 decreases from a position corresponding to the end of the substrate 122 toward a position corresponding to the optical assembly 124.

The display device according to the present disclosure has the following effects.

According to at least one of embodiments of the present disclosure, a heat dissipating structure of a backlight unit may be provided.

According to at least one of embodiments of the present disclosure, a coupling structure of a backlight unit and a frame may be provided.

According to at least one of embodiments of the present disclosure, durability or quality of a backlight unit may be improved.

According to at least one of embodiments of the present disclosure, convenience in assembly of a display device may be improved.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
    a display panel;
    a frame positioned behind the display panel;
    a substrate having an elongated shape and coupled to the frame;
    an optical assembly mounted on the substrate and configured to provide light to the display panel, the optical assembly comprising a light source mounted on the substrate and a lens covering the light source;
    a reflective sheet disposed in front of the substrate and the frame and comprising a hole through which the lens passes, and
    a plurality of holders coupling the substrate to the frame, wherein the plurality of holders comprises:
    a first holder disposed adjacent to a first elongated side of the substrate; and
    a second holder disposed adjacent to a second elongated side of the substrate opposite the first elongated side and positioned opposite to the first holder, wherein the first holder and the second holder are configured to secure the substrate,
    wherein the hole comprises:
    a first straight side portion and a second straight side portion opposite to each other;
    a first curved end portion connecting one end of the first straight side portion and one end of the second straight side portion; and
    a second curved end portion connecting the other end of the first straight side portion and the other end of the second straight side portion,
    wherein the lens is configured to press against at least one of the first straight side portion or the second straight side portion.

2. The display device of claim 1, wherein each of the first holder and the second holder is configured as a protrusion protruding from the frame, wherein the protrusion comprises a recessed groove positioned at an inner side of the protrusion facing the substrate, and wherein the groove is configured to accommodate and secure a side of the substrate.

3. The display device of claim 2, wherein the substrate comprises at least one concave substrate groove formed on elongated sides of the substrate.

4. The display device of claim 3, wherein the substrate comprises:
    a first substrate groove formed on the first elongated side of the substrate; and
    a second substrate groove formed on the second elongated side of the substrate.

5. The display device of claim 4, wherein the frame comprises:
    a plate comprising an elongated recess aligned in a direction intersecting an alignment direction of the substrate,
    wherein:
    the first holder is disposed adjacent to one end of the elongated recess; and
    the second holder is disposed adjacent to the other end of the elongated recess, wherein a distance between an upper end of the first holder and an upper end of the second holder corresponds to a width of the substrate between the first substrate groove and the second substrate groove.

6. The display device of claim 5, wherein a distance between a recessed groove of the first holder and a recessed groove of the second holder corresponds to a width of the substrate without the first substrate groove and second substrate groove.

7. The display device of claim 6,
    wherein the lens comprises:
    a side portion having a cylindrical shape and forming a lower part of the lens; and
    a dome portion having a dome shape and forming an upper part of the lens.

8. The display device of claim 7, wherein a distance from the plate to upper ends of the first and second holders is less than a distance from the plate to an upper end of the side portion of the lens.

9. The display device of claim 4, wherein the first substrate groove is symmetrical to the second substrate groove with respect to the substrate.

10. The display device of claim 4, wherein the first substrate groove is asymmetrical to the second substrate groove with respect to the substrate.

11. The display device of claim 1, wherein a distance between the plate and the reflective sheet is substantially equal to a thickness of the substrate.

12. The display device of claim 11, wherein the frame further comprises an inclined protrusion disposed adjacent to one end of the substrate and configured to contact a rear surface of the substrate.

13. The display device of claim 12, wherein a protrusion height of the inclined protrusion decreases from a position corresponding to the end of the substrate toward a position corresponding to the optical assembly.

14. The display device of claim 1, wherein the reflective sheet further comprises a plurality of accommodating holes through which the plurality of holders passes.

* * * * *